US011156799B2

(12) United States Patent
Cheng

(10) Patent No.: US 11,156,799 B2
(45) Date of Patent: Oct. 26, 2021

(54) LENS DRIVING APPARATUS

(71) Applicant: Kwok Sing Cheng, Hong Kong (HK)

(72) Inventor: Kwok Sing Cheng, Hong Kong (HK)

(*) Notice: Subject to any disclaimer, the term of this patent is extended or adjusted under 35 U.S.C. 154(b) by 779 days.

(21) Appl. No.: 15/079,043

(22) Filed: Mar. 23, 2016

(65) Prior Publication Data

US 2016/0202446 A1 Jul. 14, 2016

Related U.S. Application Data

(63) Continuation of application No. PCT/CN2014/087825, filed on Sep. 29, 2014.

(Continued)

(51) Int. Cl.
*G02B 7/08* (2021.01)
*G03B 5/00* (2021.01)
(Continued)

(52) U.S. Cl.
CPC ............. *G02B 7/08* (2013.01); *G02B 13/001* (2013.01); *G02B 27/646* (2013.01); *G03B 3/10* (2013.01);
(Continued)

(58) Field of Classification Search
CPC .. G02B 27/646; G02B 13/001; G02B 13/009; G02B 7/00; G02B 7/02; G02B 7/023; G02B 7/026; G02B 7/04; G02B 7/08; G02B 7/09; G02B 7/102; G02B 7/36; G03B 13/36; G03B 17/00; G03B 17/02;
(Continued)

(56) References Cited

U.S. PATENT DOCUMENTS

2011/0286099 A1* 11/2011 Shiraki ................. G02B 7/023
359/557
2012/0224841 A1* 9/2012 Wu ........................ G03B 17/00
396/55

(Continued)

FOREIGN PATENT DOCUMENTS

CN 102016709 A 4/2011
CN 102388330 A 3/2012
(Continued)

OTHER PUBLICATIONS

Search Report of PCT Patent Application No. PCT/CN2014/087825 dated Jan. 16, 2015.

*Primary Examiner* — Marin Pichler
*Assistant Examiner* — Mitchell T Oestreich

(57) ABSTRACT

A lens driving apparatus includes: a fixed assembly including a base frame; a movable assembly including a lens holder configured to hold a lens unit; at least one set of magnets surrounding the movable assembly; three sets of coils configured to interact with the magnets and drive the movable assembly to move along a first, a second, and a third orthogonal axes; and a spring system attached between the movable assembly and the fixed assembly. The third axis is parallel to an optical axis of the lens unit. The first and second axes are respectively perpendicular to the third axis. The three sets of coils include a set of focusing coils and two sets of side coils. The at least one set of magnets include four magnetic members attached to inside walls of the outer casing, among which each two magnetic members are placed opposing to each other.

17 Claims, 15 Drawing Sheets

Related U.S. Application Data

(60) Provisional application No. 61/886,848, filed on Oct. 4, 2013.

(51) Int. Cl.
  *G02B 27/64* (2006.01)
  *G02B 13/00* (2006.01)
  *H02K 41/035* (2006.01)
  *G03B 3/10* (2021.01)

(52) U.S. Cl.
  CPC ............ *G03B 5/00* (2013.01); *H02K 41/0354* (2013.01); *G03B 2205/0015* (2013.01); *G03B 2205/0069* (2013.01); *H02K 2201/18* (2013.01)

(58) Field of Classification Search
  CPC ............ G03B 17/12; G03B 2205/0015; G03B 2205/0069; G03B 3/00; G03B 3/02; G03B 3/10; G03B 5/00; G03B 5/02; G03B 5/0002; H04N 5/2251; H04N 5/2252; H04N 5/2253; H04N 5/2254; H04N 5/2257; H04N 5/23212; H04N 5/23248; H04N 5/23264; H04N 5/23287; H04N 5/335; H02K 2201/18; H02K 41/0354; H02K 41/0356; Y10T 29/49002; Y10T 29/4902; B81B 3/00
  USPC ....... 359/554, 557, 694, 811, 814, 819, 822, 359/823, 824; 310/12.16; 257/684; 348/208.4, 208.5, 208.11, 208.2, 208.7, 348/208.99, 335, 345, 373, 374, E5.024, 348/E5.028, E5.045, E5.046; 396/52, 55, 396/133, 529
  See application file for complete search history.

(56) References Cited

U.S. PATENT DOCUMENTS

2012/0314308 A1* 12/2012 Ikushima ............. G02B 27/646
  359/814
2014/0160311 A1* 6/2014 Hwang ................ G02B 27/646
  348/208.99

FOREIGN PATENT DOCUMENTS

| CN | 102472944 A | 5/2012 |
| CN | 102650722 A | 8/2012 |
| CN | 102902038 A | 1/2013 |
| CN | 202956526 U | 5/2013 |

* cited by examiner

LENS DRIVING APPARATUS

CROSS-REFERENCE TO RELATED APPLICATIONS

The present application is a Continuation Application of PCT application No. PCT/CN2014/087825 filed on Sep. 29, 2014, which claims the benefit of U.S. provisional patent application No. 61/886,848 filed on Oct. 4, 2013; the contents of which is hereby incorporated by reference.

FIELD OF THE PATENT APPLICATION

The present patent application generally relates to optical imaging technologies and more specifically to a lens driving apparatus with a three axes lens shifting mechanism for focusing an image and preventing a blurred image caused by unwanted shaking such as the shaking of a user's hand from being taken.

BACKGROUND

Portable imaging devices such as a mobile phone or a digital camera have been widely used today. Such devices have a camera with a lens structure to focus an image. In addition, such a device may be subject to some amount of unwanted shaking when being used to take a picture. An example of such shaking is the shaking of a user's hand. Therefore, it is desired to have a lens driving apparatus as well as a lens shifting mechanism that is capable of performing auto-focusing and anti-shaking functions, and achieving size reduction, cost reduction, fast response and stable actuation with a simple structure, and desired to have an image capturing apparatus equipped with such a lens shifting mechanism.

SUMMARY

The present patent application is directed to a lens driving apparatus. In one aspect, the lens driving apparatus includes: an outer casing; a fixed assembly, the fixed assembly including a base frame; a movable assembly, the movable assembly including a lens holder configured to hold a lens unit; a set of magnets surrounding the movable assembly; three sets of coils configured to interact with the magnets and drive the movable assembly to move along a first, a second, and a third orthogonal axes; and a spring system attached between the movable assembly and the fixed assembly. The third axis is parallel to an optical axis of the lens unit, while the first and second axes are respectively perpendicular to the third axis. The three sets of coils include a focusing coil and two sets of side coils. The spring system includes a top spring and a bottom spring. The set of magnets include four magnetic members attached to inside walls of the outer casing, among which each two magnetic members are placed opposing to each other. Each magnetic member faces coil plane of one of the side coils. The side coils are attached on sidewalls of the lens holder. The focusing coil is wound around the lens holder.

Polar surfaces of the magnetic members facing the coils may be of the same magnetic polarity. The longest length of each side coil may be longer than the longest length of each magnetic member. Among the two sets of side coils, a first set of side coils may be attached on two opposite outer peripheral sidewalls of the lens holder. The first set of side coils may be wound around the second axis and the plane of the first set of side coils may be perpendicular to the second axis. A second set of side coils may be attached on another two outer peripheral sidewalls of the lens holder, while the second set of side coils may be wound around the first axis and the plane of the second set of side coils may be perpendicular to the first axis.

The side coils may be overlapped with the focusing coil. Wires of the side coils may be placed near an edge of polar surfaces of the magnetic members respectively. Current of the side coils may be cutting tangential magnetic field of the magnetic members respectively. The tangential magnetic field may be parallel to polar surfaces of the magnetic members respectively, and driving forces along the first and second axes may be induced by the two sets of side coils and the tangential magnetic field.

The focusing coil may be placed approximately at a mid-point between the top spring and the bottom spring. The focusing coil may be wound around an outer peripheral sidewall of the lens holder and placed at a mid-position of the lens holder along the third axis.

The two sets of side coils may include four side coils, while four peripheral sidewalls of the focusing coil may be in the same plane as four coil planes of the four side coils respectively. The lens driving apparatus may further include a magnetic field correction unit that is inserted between the magnetic members and configured to guide the magnetic field between the magnetic members. The magnetic field correction unit may have a plane shape, a ring shape or a tube shape, installed on top or bottom of the magnet set, and constructed by a yoke material or a ferromagnetic material.

The focusing coil may be placed approximately at a middle position of the magnetic members. Current of the focusing coil may be cutting a normal magnetic field of the magnetic members. The normal magnetic field may be perpendicular to polar surfaces of the magnetic members. A driving force along the third axis may be induced by the focusing coil and the normal magnetic field.

The focusing coil and the side coils may be configured to interact with the four magnetic members, but to independently generate driving forces along the three orthogonal axes respectively for moving the movable assembly.

In another aspect, the lens driving apparatus includes: a fixed assembly, the fixed assembly including a base frame; a movable assembly, the movable assembly including a lens holder configured to hold a lens unit; at least one set of magnets surrounding the movable assembly; three sets of coils configured to interact with the magnets and drive the movable assembly to move along a first, a second, and a third orthogonal axes; and a spring system attached between the movable assembly and the fixed assembly. The third axis is parallel to an optical axis of the lens unit, while the first and second axes are respectively perpendicular to the third axis. The three sets of coils include a set of focusing coils and two sets of side coils. The at least one set of magnets include four magnetic members attached to inside walls of an outer casing, among which each two magnetic members are placed opposing to each other. The focusing coil is wound around the lens holder.

Among the two sets of side coils, a first set of side coils may be wound around the third axis and plane of the first set of side coils may be perpendicular to the third axis, while a second set of side coils may be wound around the third axis and plane of the second set of side coils may be perpendicular to the third axis. The set of focusing coils may include two focusing coils, while the two sets of side coils may be placed at a same plane and between the two focusing coils.

In yet another aspect, the lens driving apparatus includes: a fixed assembly, the fixed assembly including a base frame; a movable assembly, the movable assembly including a lens holder configured to hold a lens unit; a set of magnets surrounding the movable assembly; three sets of coils configured to interact with the magnets and drive the movable assembly to move along a first, a second, and a third orthogonal axes; and a spring system attached between the movable assembly and the fixed assembly. The third axis is parallel to an optical axis of the lens unit, while the first and second axes are respectively perpendicular to the third axis. The three sets of coils include a focusing coil and two sets of side coils. Each set of magnets include four magnetic members attached to inside walls of an outer casing, among which each two magnetic members are placed opposing to each other. The focusing coil is wound around an outer peripheral sidewall of the lens holder and placed at a mid-position of the lens holder along the third axis. Among the two sets of side coils, a first set of side coils are attached on two opposite outer peripheral sidewalls of the lens holder, while a second set of side coils are attached on another two outer peripheral sidewalls of the lens holder.

The first set of side coils may be wound around the second axis and plane of the first set of side coils may be perpendicular to the second axis, while the second set of side coils may be wound around the first axis and plane of the second set of side coils may be perpendicular to the first axis.

The focusing coil and the two sets of side coils may be configured to interact with the magnetic members, but to independently generate driving forces along the three orthogonal axes respectively for moving the movable assembly.

BRIEF DESCRIPTIONS OF THE DRAWINGS

FIG. 8b is a perspective view of the lens driving apparatus of FIG. 8a.

FIG. 9b is an exploded perspective view of the lens driving apparatus of FIG. 9a.

FIG. 9c illustrates the magnet sets of the lens driving apparatus of FIG. 9a.

DETAILED DESCRIPTION

Figure 1:
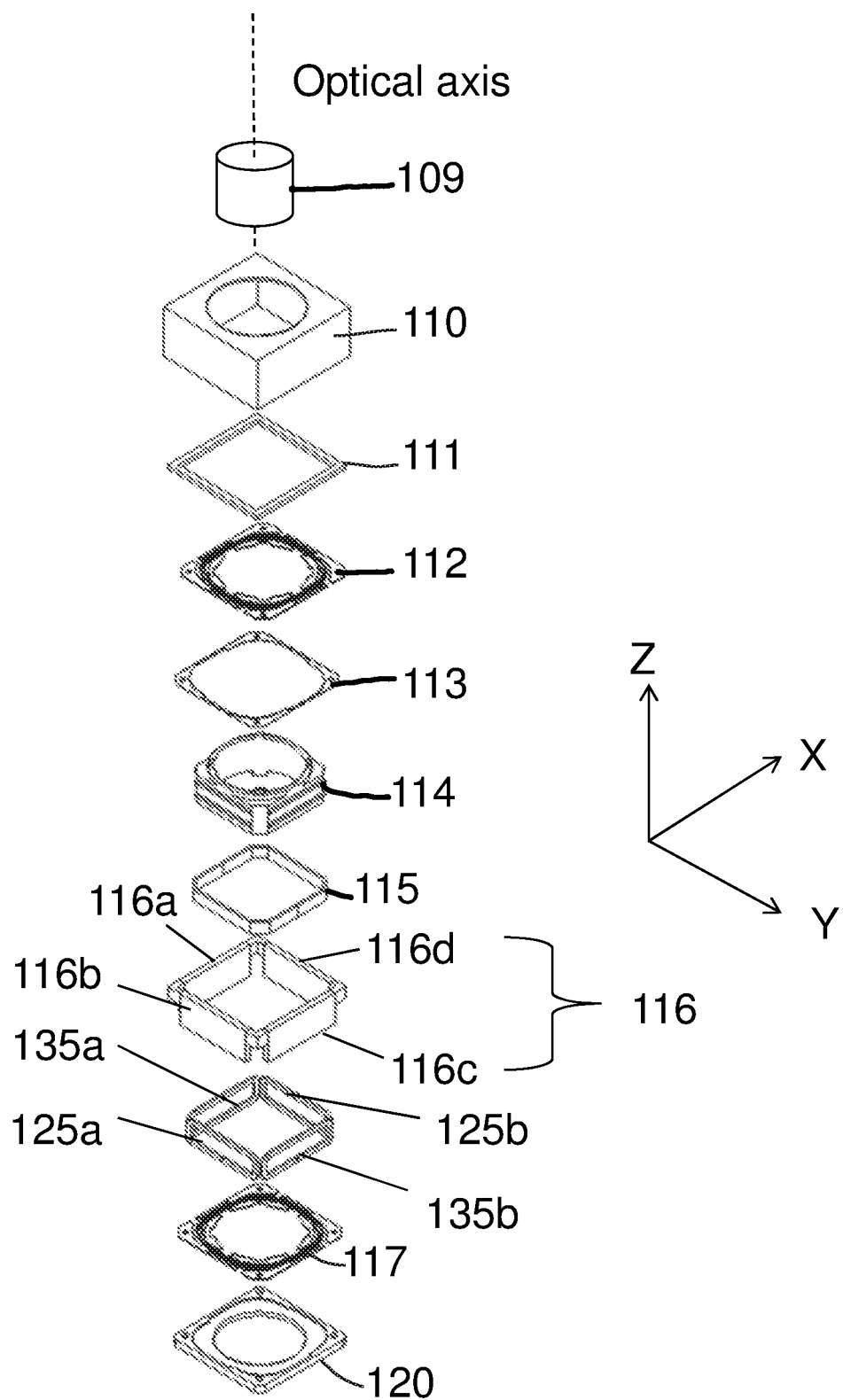
FIG. 1 is an exploded perspective view of a lens driving apparatus with a three axis lens shifting mechanism according to an embodiment of the present patent application.

Reference will now be made in detail to a preferred embodiment of the lens driving apparatus disclosed in the present patent application, examples of which are also provided in the following description. Exemplary embodiments of the lens driving apparatus disclosed in the present patent application are described in detail, although it will be apparent to those skilled in the relevant art that some features that are not particularly important to an understanding of the lens driving apparatus may not be shown for the sake of clarity.

Furthermore, it should be understood that the lens driving apparatus disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

An embodiment of the present patent application provides a lens driving apparatus that drives an image forming lens to move in order to perform optical functions. The lens driving apparatus can be applied to an imaging device that includes a light receiving surface. The imaging device is configured to convert optical image formed on the light receiving surface into an electric signal. The lens driving apparatus includes an imaging lens guiding an image of a subject to the light receiving surface, a movable assembly that includes an image forming lens and a lens holder, and a fixed part holding the imaging device and supporting the movable assembly to be movable translationally in three axes. The first axis is parallel to the direction of the optical axis (Z-axis) of the image forming lens. The second X and third Y axes are perpendicular to the optical axis of the image forming lens.

In this embodiment, the lens driving apparatus includes: a movable assembly that includes image forming lens and a lens holder, a fixed assembly, three sets of coils including one set of focusing coil and two sets of side coils, one set of magnets surrounding the movable assembly, a spring system attached between the movable assembly and fixed assembly and configured for supporting the movable assembly and forming a suspension system to allow the movable assembly to move along the three axes (Z, X and Y axes). Z-axis is parallel to the optical axis of the image forming lens. X-axis and Y-axis are two orthogonal axes perpendicular to the Z-axis. The spring system also provides a restoring force for the motion of the movable assembly. The three set of coils are configured to interact with the surrounding magnet set for driving the movable assembly to move along the three axes. The movable assembly is driven by the focusing coil to move along the optical axis (Z-axis) for focusing actions. Two set of side coils drive the movable assembly to move along the X-axis and Y-axis for anti-shaking actions. The focusing coil is wound around a peripheral sidewall of the lens holder and the winding direction of focusing coil is parallel to the optical axis (Z-axis). The two sets of side coils are attached on sidewalls of the lens holder and the two sets of side coils are wound around X and Y axis, respectively. The magnet set is configured to surround the movable part and face the two sets of side coils. The polar surface of magnet is facing the sidewall of lens holder and the side coil.

In this embodiment, the movable assembly is driven by the focusing coil along the Z-axis when the focusing coil is energized and interacted with the magnets. It is capable to perform the focusing action for image capturing device. Furthermore, the movable assembly is driven by two sets of side coils along X-axis and Y-axis, respectively, when the two sets of side coils are energized and interacting with the magnets. The movable assembly is capable of performing the anti-shaking actions for the image capturing device.

FIG. 1 is an exploded perspective view of a lens driving apparatus with a three axis lens shifting mechanism according to an embodiment of the present patent application. The lens driving apparatus can perform auto-focusing and anti-shaking function mainly for installation on a portable device (not shown) to serve as an advanced image pickup module. The portable device may be, for example, a camera, a mobile phone, and etc.

Referring to FIG. 1, the lens driving apparatus includes a fixed assembly including a base frame 120; a movable assembly including a lens unit 109 and a lens holder 114; a top spring 112; a bottom spring 117; a set of magnets 116; three sets of coils; a spacer 111; and an outer casing 110. The top spring 112 and the bottom spring 117 connect the movable assembly and the fixed assembly. The set of magnets 116 include four magnetic members 116a, 116b, 116c and 116d. The three sets of coils include one focusing coil 115 and two sets of side coils 125a,b and 135a,b.

In this embodiment, the fixed assembly includes a base frame 120. The base frame has a rectangular configuration. The bottom spring 117 and the magnet set 116 are attached to the top of the base frame 120. The four magnetic members 116a, 116b, 116c and 116d of the magnet set are attached to the inside walls of the outer casing 110. The outer casing 110 is placed on top of the base frame 120. The first magnetic member 116a is opposite to the third magnetic member 116c. The second magnetic member 116b is opposite to the fourth magnetic member 116d. The outer casing 110, four magnetic members and the base frame 120 form a central empty space configured for receiving the movable assembly. The base frame 120 is placed on an image sensor (not shown in FIG. 1) such as a CCD or a CMOS imaging sensor. A through hole defined in a central portion of the base frame 120 receives the light focused from the lens unit, while an image is focused by the lens unit and received by the image sensor.

The bottom spring 117 and the top spring 112 connect the fixed assembly and movable assembly and form a suspension system to hold and support the movable assembly to move along three axes. The first axis Z-axis is parallel to the optical axis of the lens unit. The second axis X-axis and the third axis Y-axis are perpendicular to the Z axis. For example, the second axis X-axis is the alignment line of the second magnetic member 116b and fourth magnetic member 116d. The third axis Y-axis is the alignment line of the first magnetic member 116a and the third magnetic member 116c. The three axes may be perpendicular to each other. The outer casing 110 is placed to enclose the magnet set 116 and the movable assembly. The outer case may be made of yoke material such as iron, which may act as a yoke to guide the magnetic field of the magnet set 116.

Figure 2:
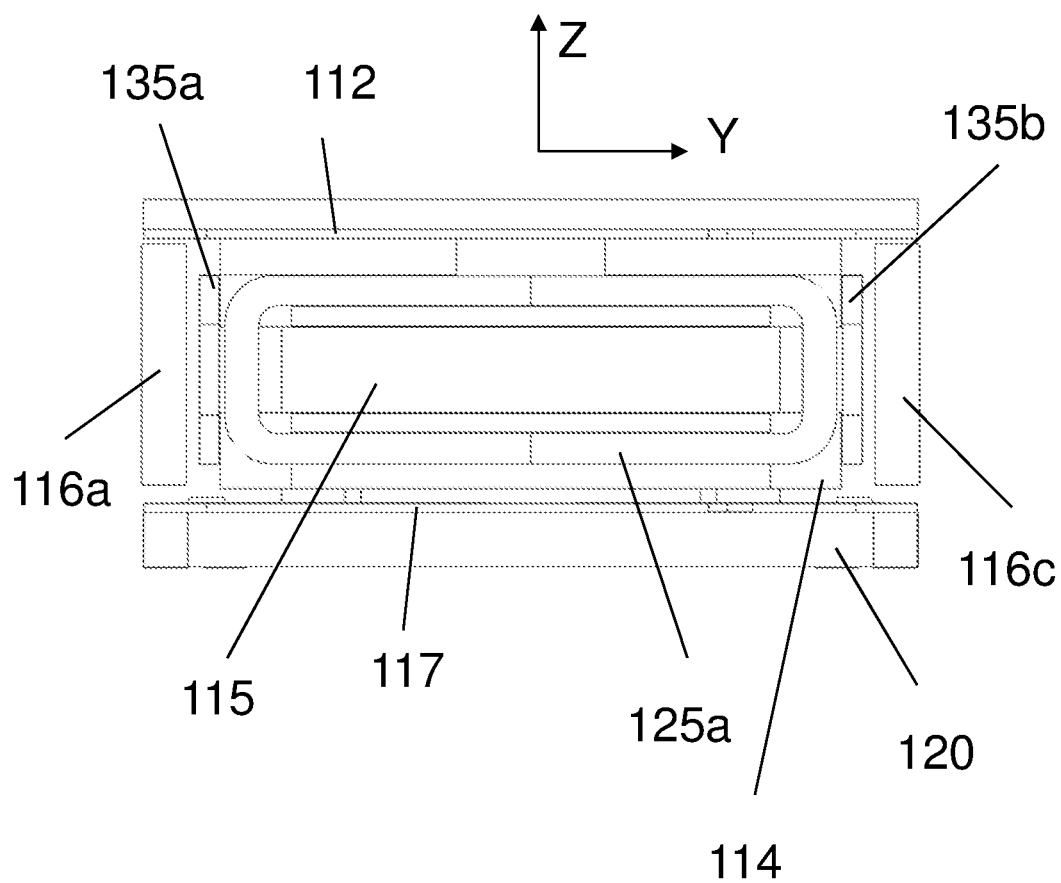
FIG. 2 is a cross-sectional view of the lens driving apparatus depicted in FIG. 1 from X-axis direction.

FIG. 2 is a cross-sectional view of the lens driving apparatus depicted in FIG. 1 from X-axis direction. Referring to FIG. 2, the magnetic member 116a and magnetic member 116c are placed near the two sides of the base frame. The side coils 135a and 135b are facing the magnetic member 116a and magnetic member 116c, respectively. The focusing coil 115 is wound around the lens holder 114. The focusing coil is placed approximately at the mid-point between the top spring and the bottom spring. The side coil 135a, 135b, 125a and 125b (not shown in FIG. 2) are placed and attached on four sidewalls of the lens holder 114. The side coils may be overlapped with focusing coil.

Figure 3A:
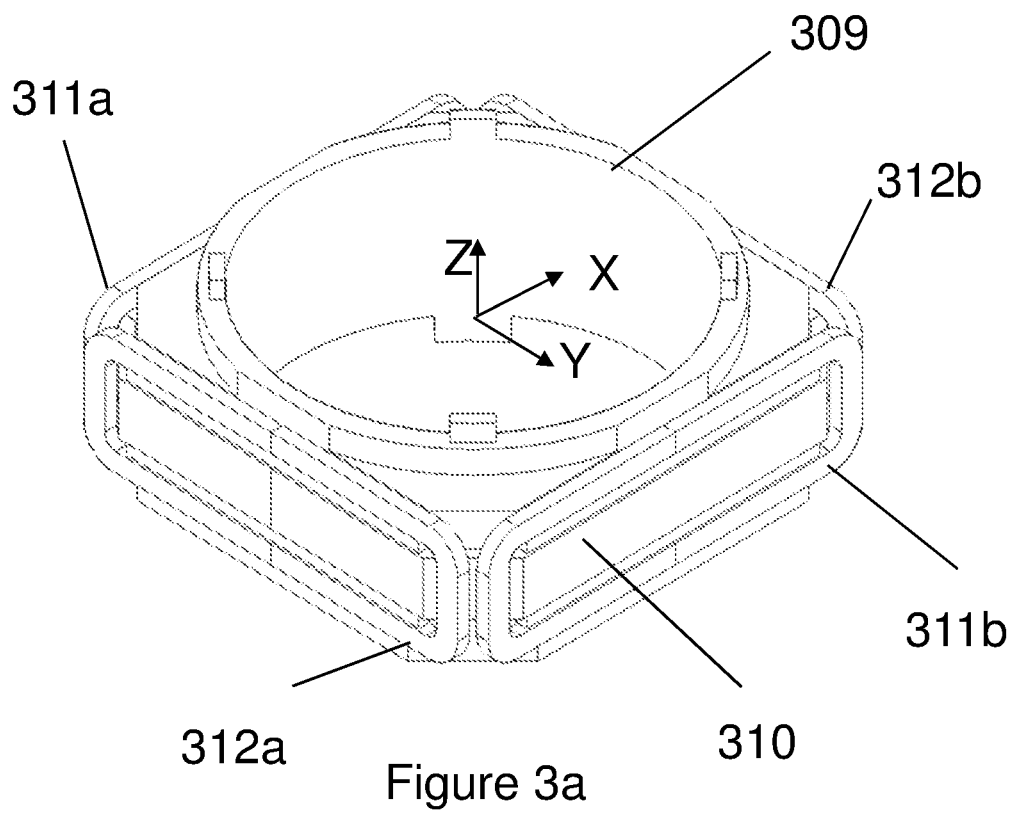
FIG. 3a is a perspective view illustrating the arrangement of the focusing coil, the two sets of side coils and the lens holder.
Figure 3B:
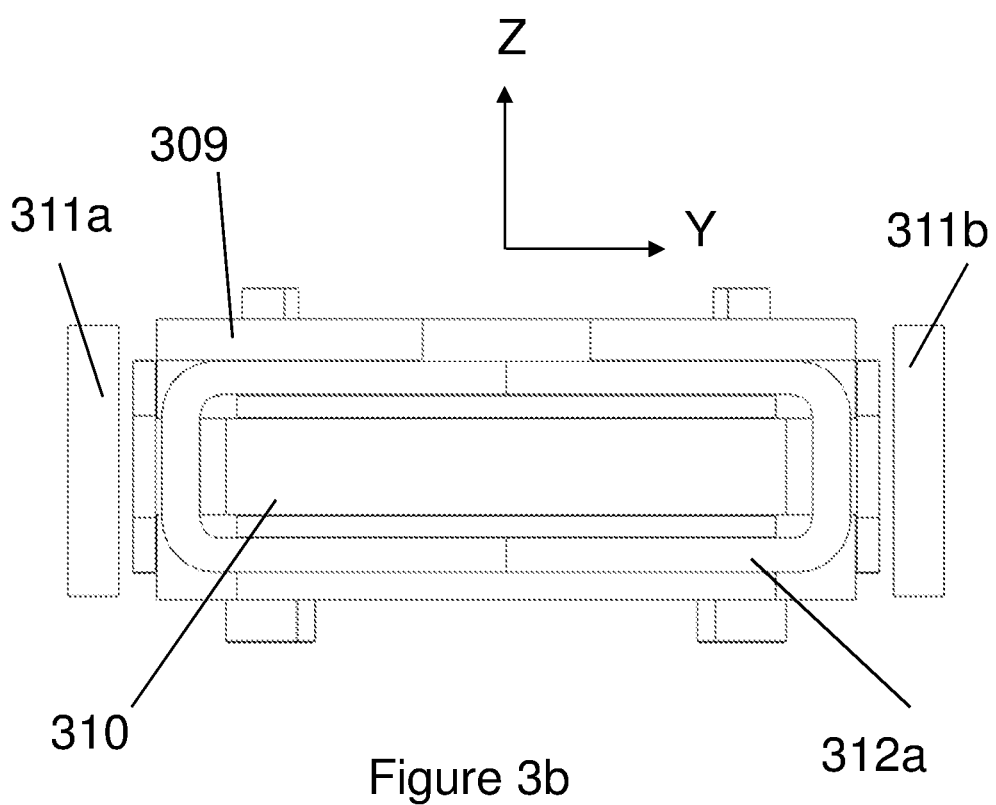
FIG. 3b is cross-sectional view illustrating the arrangement of the focusing coil, the two sets of side coils and the lens holder.

FIGS. 3a and 3b show the arrangement of the focusing coil, the two sets of side coils and the lens holder. The lens holder 309 may have a polygonal-tube shape. The focusing coil 310 is wound around the outer peripheral sidewall of the lens holder and placed at the mid-position of the lens holder along Z-axis. The focusing coil may have a polygonal-tube shape. The focusing coil is wound around Z-axis and the plane of focusing coil is perpendicular to Z-axis. The first set of side coils 311a and 311b are attached on the two opposite outer peripheral sidewalls of the lens holder. The first set of side coil 311a and 311b are wound around Y-axis and the plane of the side coils 311a and 311b are perpendicular to Y-axis. The second set of side coils 312a and 312b are attached on another two outer peripheral sidewalls of the lens holder. The second set of side coils 312a and 312b are wound around X-axis and the plane of the side coils 312a and 312b are perpendicular to X-axis. The four peripheral sidewalls of the focusing coil may be in the same plane as the four coil planes of the four side coils respectively.

Figure 4A:
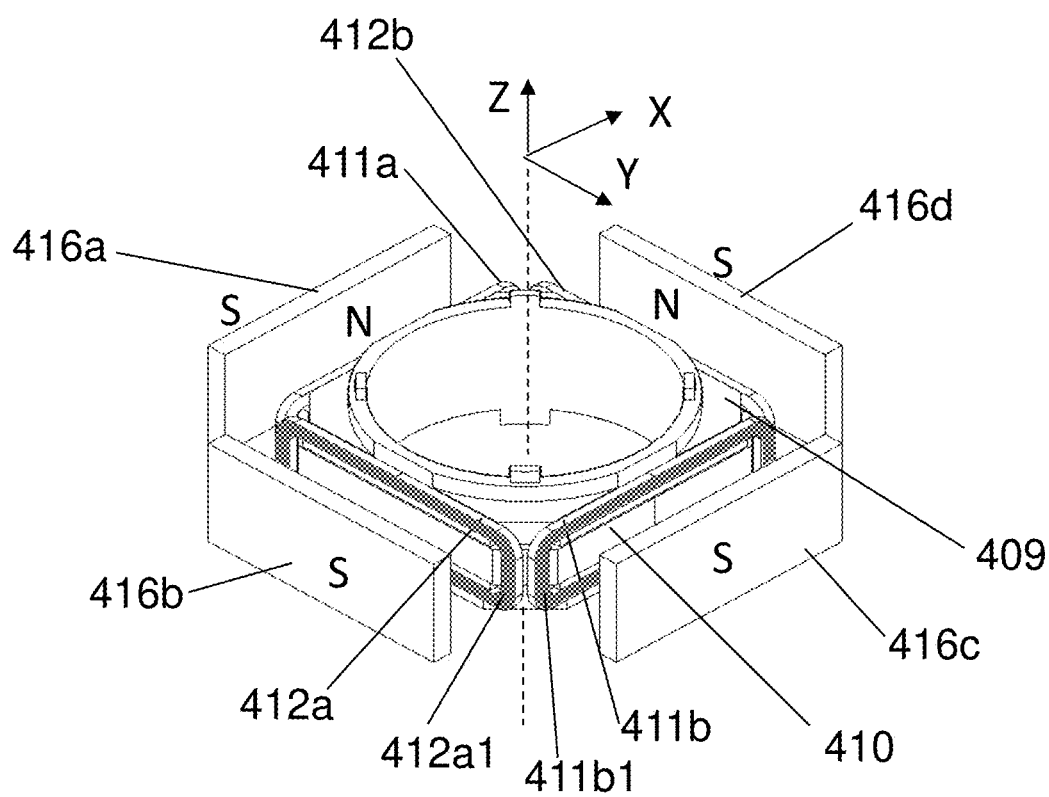
FIG. 4a is perspective view illustrating the relationships between the coil sets, the lens holder, and the magnet set.
Figure 4B:
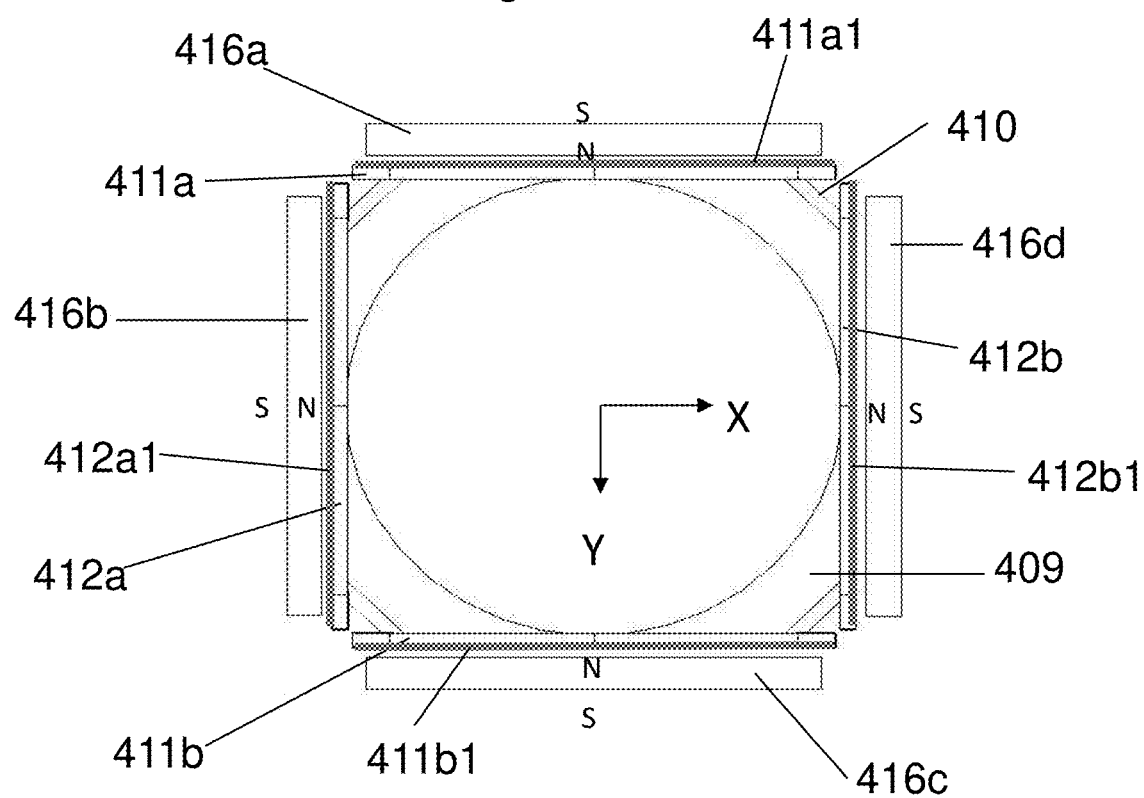
FIG. 4b is cross-sectional view illustrating the relationships between the coil sets, the lens holder, and the magnet set.

FIGS. 4a and 4b show the relationships between the coil sets, the lens holder, and the magnet set. The magnet set includes four magnetic members 416a, 416b, 416c and 416d. Each magnetic member faces the coil plane of one of the side coils. The alignment lines of the magnet pole of the magnetic members 416a and 416c are parallel to Y-axis. The alignment lines of the magnet pole of the magnetic members 416b and 416d are parallel to X-axis. For example, the north polar surface of the magnetic member 416a is facing the coil 411a. The north polar surfaces of the magnetic member 416a and the coil plane 411a1 of coil 411a are both perpendiculars to the Y-axis. The north polar surface of the magnetic member 416b and the coil plane 412a1 of the coil 412a are both perpendicular to X-axis. The north polar surface of the magnetic member 416c is facing the coil 411b. The north polar surface of the magnetic member 416c and the coil plane 411b1 of coil 411b are both perpendicular to the Y-axis. The north polar surface of the magnetic member 416d is facing the coil 412b. The north polar surface of the magnetic member 416d and the coil plane 412b1 of coil 412b are both perpendicular to the X-axis. Both the focusing coil and the two sets of side coils interact with the magnet set so as to generate force along three axes Z, X and Y respectively. It is noted that polar surfaces of the magnet members facing the coils are of the same magnetic polarity.

As shown in FIG. 4b, the longest lengths of the side coils 411a, 412a, 411b, and 412b are longer than the longest lengths of the magnet members 416a, 416b, 416c, and 416d respectively.

Figure 5A:
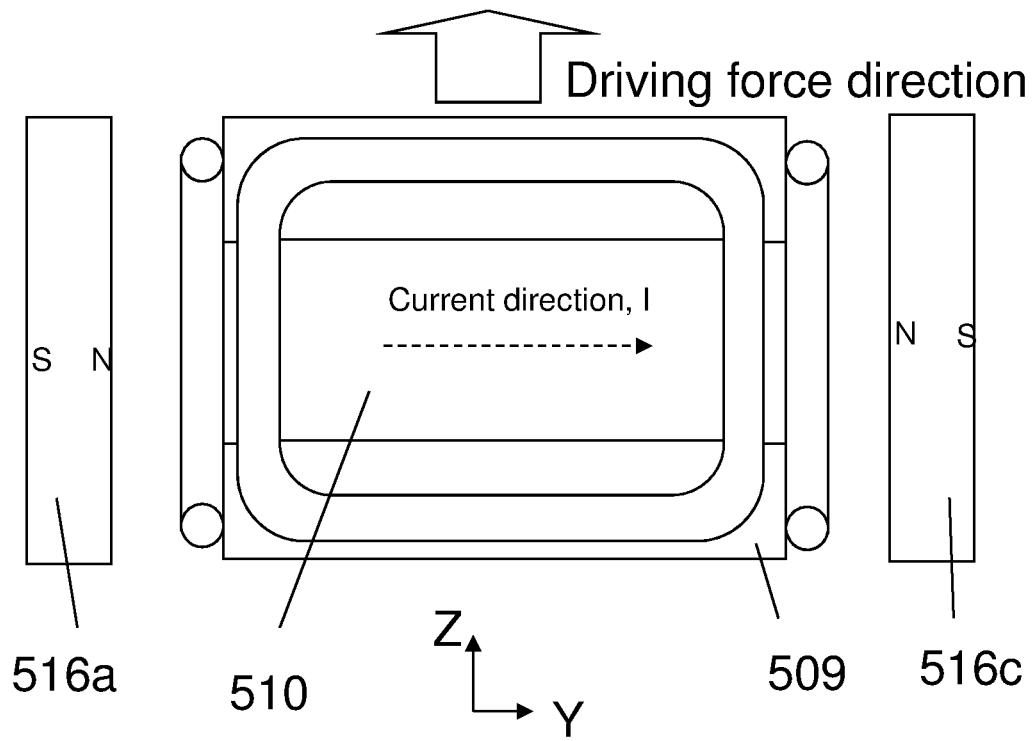
FIG. 5a is a diagram showing the working mechanism of the focusing coil and the magnet set driving the movable assembly to move along Z-axis.
Figure 5B:
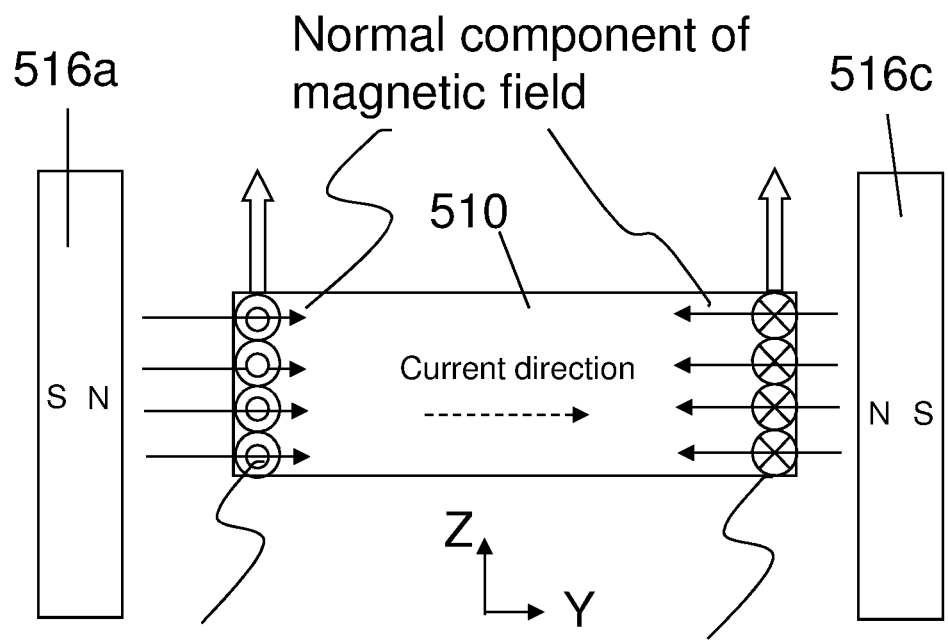
FIG. 5b is another diagram showing the working mechanism of the focusing coil and the magnet set driving the movable assembly to move along Z-axis.
Figure 5C:
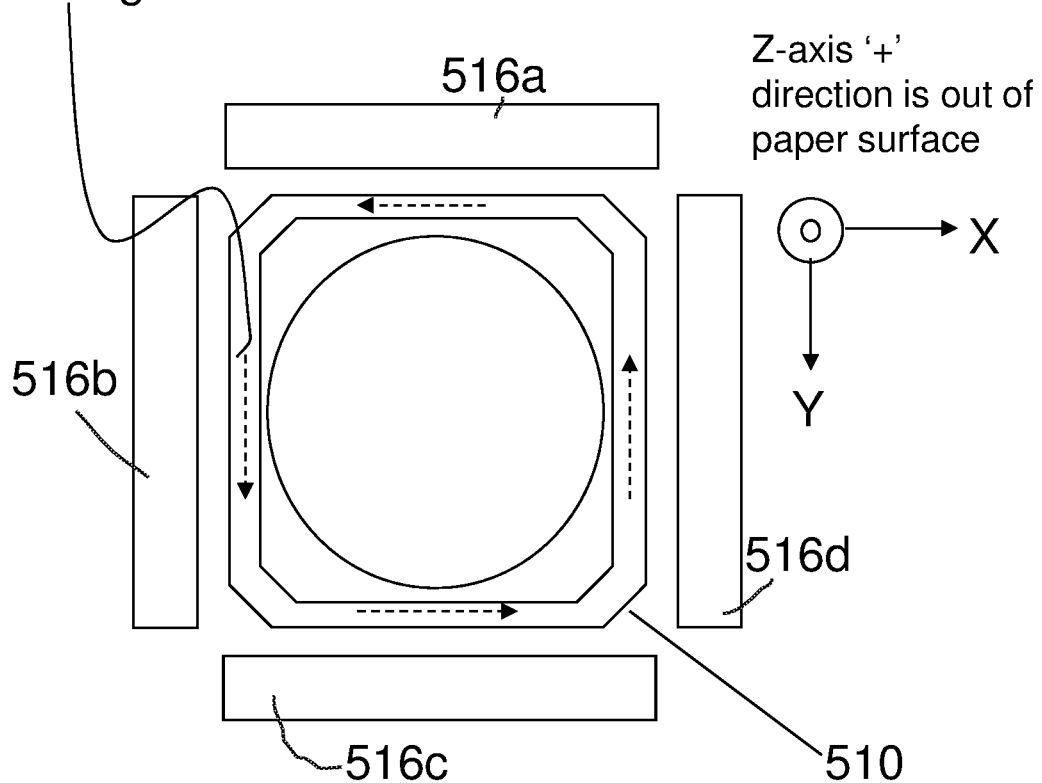
FIG. 5c is yet another diagram showing the working mechanism of the focusing coil and the magnet set driving the movable assembly to move along Z-axis.
Figure 5D:
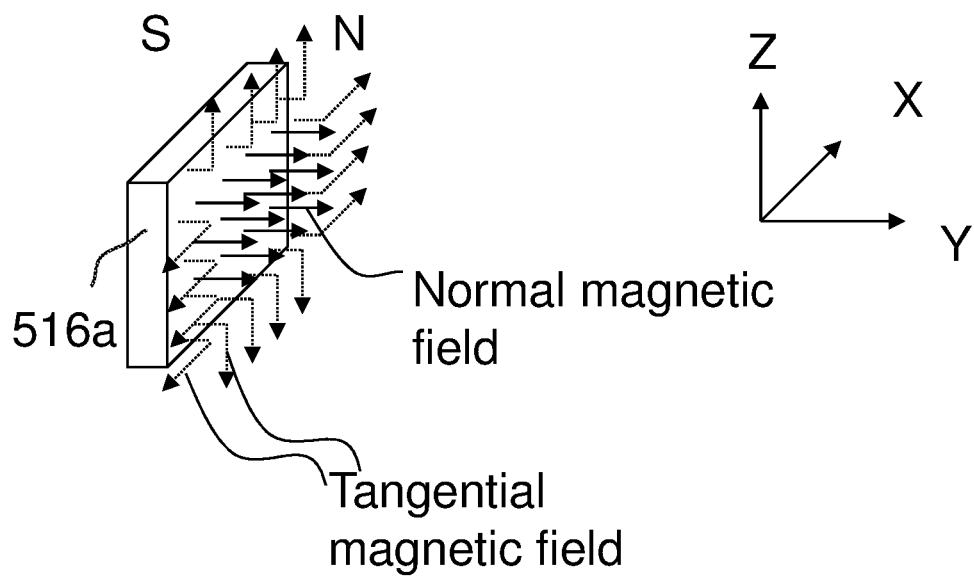
FIG. 5d shows the field distribution on the polar surface of a magnetic member.

FIGS. 5a, 5b and 5c show the working mechanism of the focusing coil and the magnet set driving the movable assembly to move along Z-axis. The focusing coil 510 interacts with the magnet set 516a-d to drive the lens holder to move along Z-axis. FIGS. 5b and 5c illustrate an example of the detailed working principle of a focusing coil driving the lens holder to move along a '+' direction of Z-axis. Referring to FIG. 5c, the current direction passing through focusing coil is anti-clockwise along the '+' of Z-axis (the '+' direction is illustrated in FIGS. 5b and 5c). When a current (shown in FIGS. 5b and 5c) passes through the focusing coil 510, the current in the focusing coil wire cutting and interacting with the normal magnetic field of the magnet set (for example 516a and 516c) generates a driving force along the Z-axis. In FIG. 5b, it shows the focusing coil 510 interacting with the magnet set induces a driving force along a '+' direction of Z-axis under the Fleming's left-hand rule. The focusing coil is placed approximately at the middle position of the magnetic members 516a and 516c. The current of the focusing coil is cutting the normal magnetic field of the magnetic members. The current direction is perpendicular to the direction the normal magnetic field of the magnet. The field distribution on the polar surface of the magnetic member 516a is shown in FIG. 5d. The magnetic field at the middle position or central position of the magnet includes a high intensity and strength normal magnetic field component. The normal magnetic field is perpendicular to the polar surface. The driving force along the Z-axis (the direction is parallel to the polar surface of magnet) is induced by the focusing coil and the normal magnetic field of magnet under the Fleming's left-hand rule. Therefore, the focusing coil is better to be placed at the middle position or central position of the magnets in order to induce a strong Z-axis direction electromagnetic force. In this embodiment, the focusing coil current cutting the high strength of normal magnet field component induces an electromagnetic force along the Z-axis to drive the lens holder to move along the Z-axis.

Figure 6A:
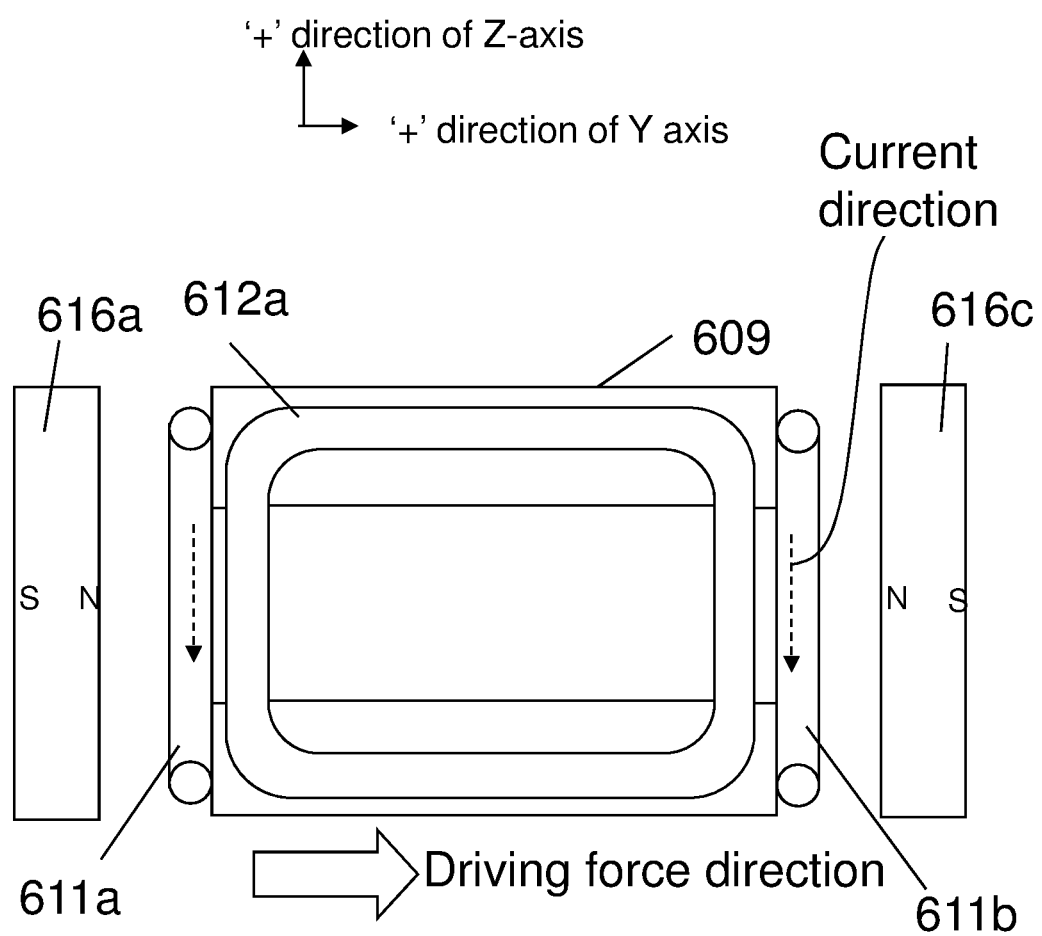
FIG. 6a is a diagram illustrating the working mechanism of the two side coils and the magnet set to drive the movable assembly to move along Y-axis and X-axis.
Figure 6B:
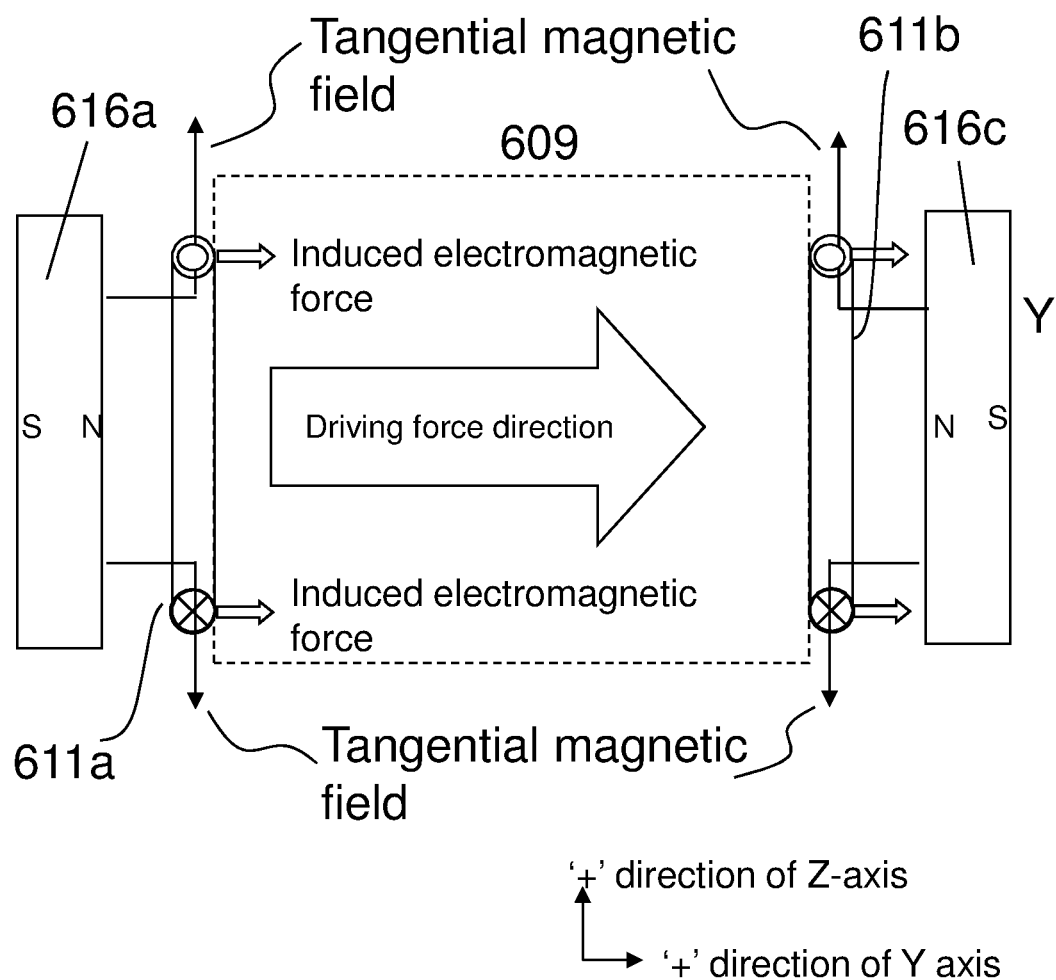
FIG. 6b is another diagram illustrating the working mechanism of the two side coils and the magnet set to drive the movable assembly to move along Y-axis and X-axis.

FIGS. 6a-6d shows the working mechanism of the two side coils and the magnet set to drive the movable assembly to move along Y-axis and X-axis. Referring to FIG. 6a, the current direction of one side coil set 611a and 611b is shown. The direction of current of 611a is same as the direction of current of 611b. The side coil set 611a and 611b interact with the magnetic members 616a and 616c to induce an electromagnetic force to move the lens holder 609s along the Y-axis. The Y-axis direction electromagnetic force is induced by the current of the coil set 611a and 611b and the tangential field of magnetic members 616a and 616c under the Fleming's left-hand rule. Since each side coil faces the polar surface of a magnetic member and the wire of the side coil is located near the edge region of the magnetic member, the side coil mainly cut the tangential magnetic field of magnetic field. Referring to FIG. 5d, a strong and high intensity of tangential magnetic field is located at the edge region of the polar surface of the magnetic member. The tangential magnetic field is parallel to the polar surface of the magnetic member. In order to generate a strong Y-axis direction driving force, the side coils are ideally placed near the edge region or edge position of the magnetic members.

Figure 6C:
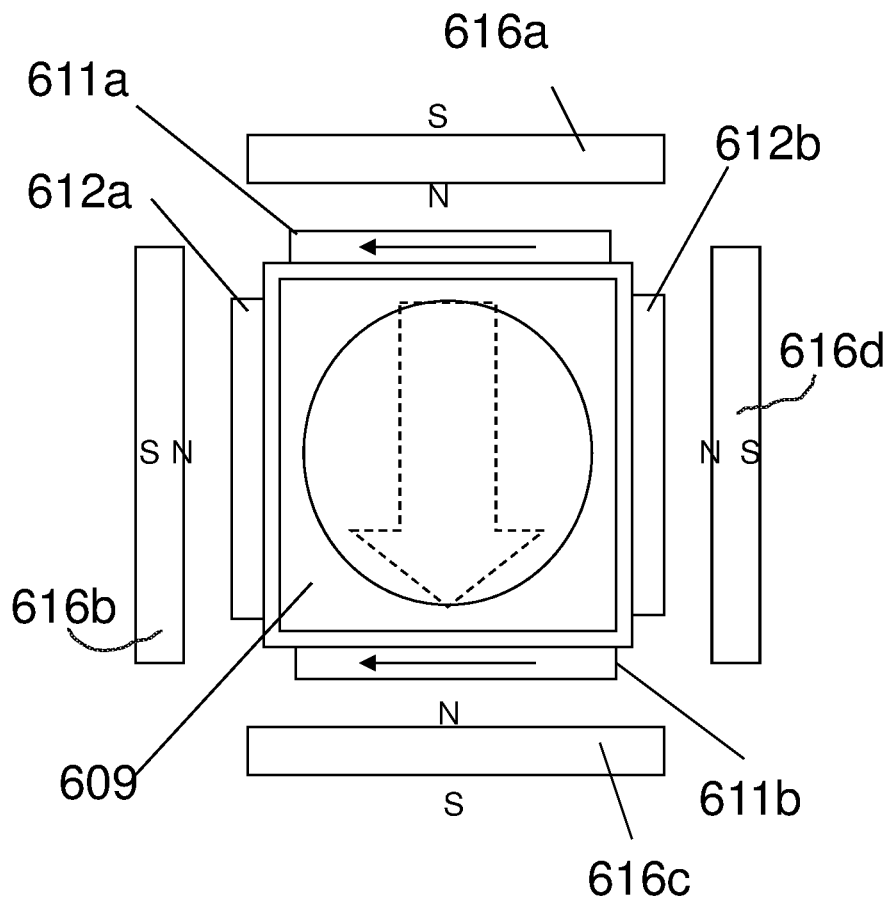
FIG. 6c is yet another diagram illustrating the working mechanism of the two side coils and the magnet set to drive the movable assembly to move along Y-axis and X-axis.
Figure 6C:
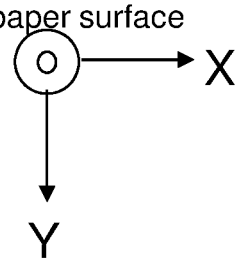
Figure 6D:
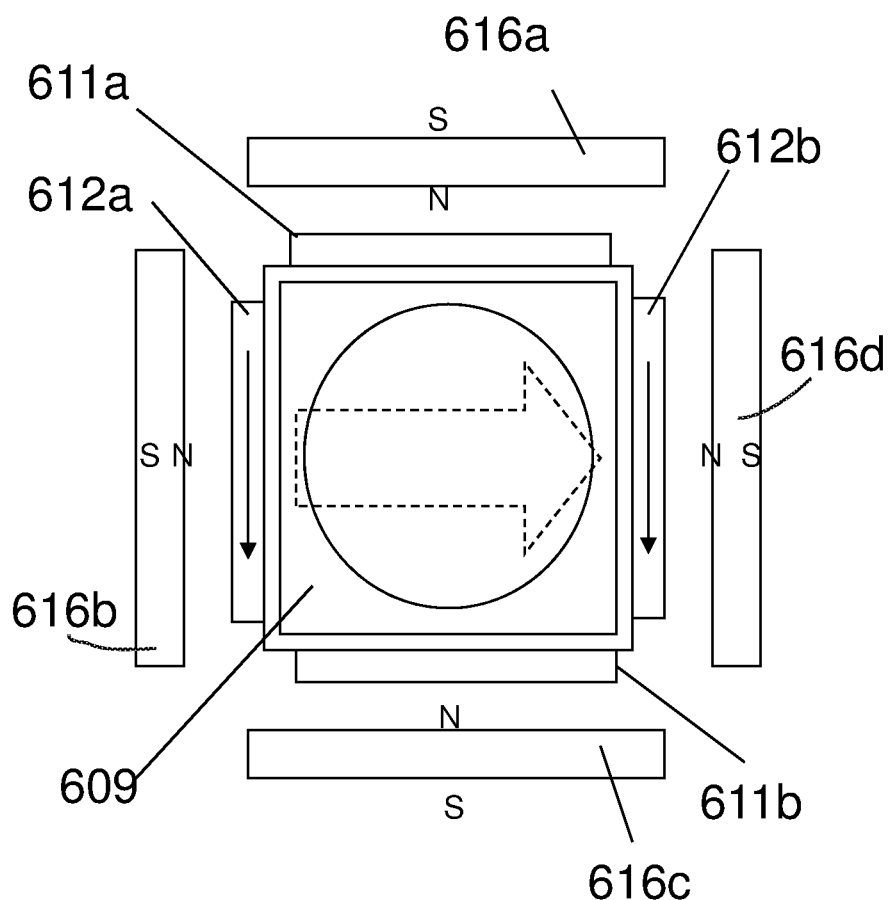
FIG. 6d is still another diagram illustrating the working mechanism of the two side coils and the magnet set to drive the movable assembly to move along Y-axis and X-axis.

The lens holder 609 can be independently driven to move along Y-axis and X-axis by independently energizing the first side coil set 611a and 611b and the second side coil set 612a and 612b. Referring to FIG. 6C, when the first side coil set is energized (current passes through 611a and 611b), the side coils would induce a drive force along Y-axis under the Fleming's left-hand rule. By controlling the direction of current of the side coil set 611a and 611b, the lens holder 609 can be moved backward or forward along the Y-axis. Referring to FIG. 6D, when the first side coil set is energized (current passes through 612a and 612b), the side coils would induce a drive force along the X-axis under the Fleming's left-hand rule. By controlling the direction of current in the coils 612a and 612b, the lens holder 609 may be moved backward or forward along X-axis. In this embodiment, the focusing coil and the two sets of side coils interact with the same set of magnets, but are configured to independently generate driving forces in three orthogonal directions respectively for moving the movable assembly.

The side coil sets are located near the edge region of the polar surfaces of the magnetic members and cutting the tangential magnetic field to induce electromagnetic force along Y-axis and X-axis. When the movable assembly is moved along the Z-axis (for example, when the lens driving apparatus is performing a focusing action), the relative position of the side coil sets and the polar surfaces of the magnetic member will change and produce a misalignment between the magnets and side coils. Under this misalignment, the tangential magnetic field intensity across the four arms of a side coils will be unbalanced and uneven. It may generate unwanted direction driving force (the driving force may no longer be along the desired direction) on the side coil sets.

Figure 7:
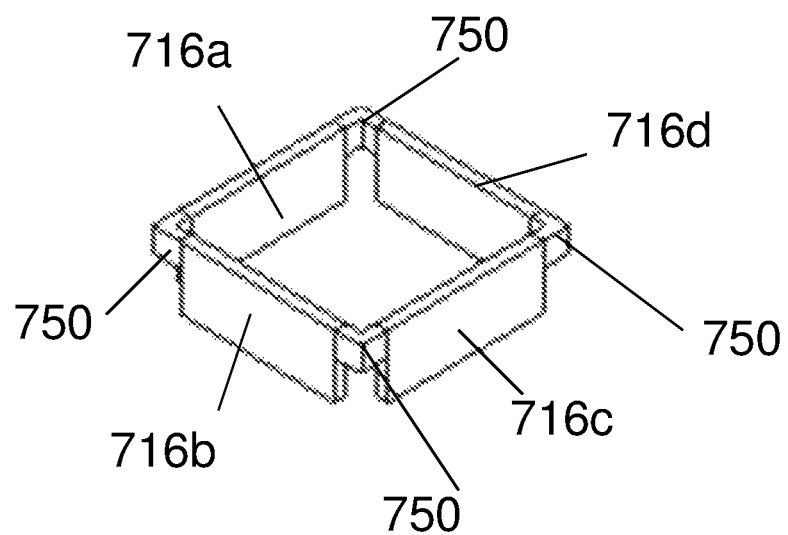
FIG. 7 shows a magnetic field correction unit which is used to guide the magnetic field at the edge region of a magnetic member.

FIG. 7 shows a magnetic field correction unit 750 which is used to guide the magnetic field at the edge region of a magnetic member. By guiding the magnetic field at the edge region of the magnetic member, the uneven distribution of tangential magnetic field across the four arms of a side coil may be reduced. The magnetic field correction unit 750 can correct the influence of misalignment between the magnet and the side coil in order to ensure the side coil induces a driving force along the desired direction. Referring to FIG. 7, the magnetic field correction unit 750 is inserted between the magnets members 716a-716d and guiding the magnetic field between the magnetic members. The magnetic field correction unit 750 may be in a plane shape, a ring shape or a tube shape. It may be installed on top or bottom of the magnet set. The magnetic field correction unit 750 may be constructed by yoke material or ferromagnetic material, such as iron.

Figure 8A:
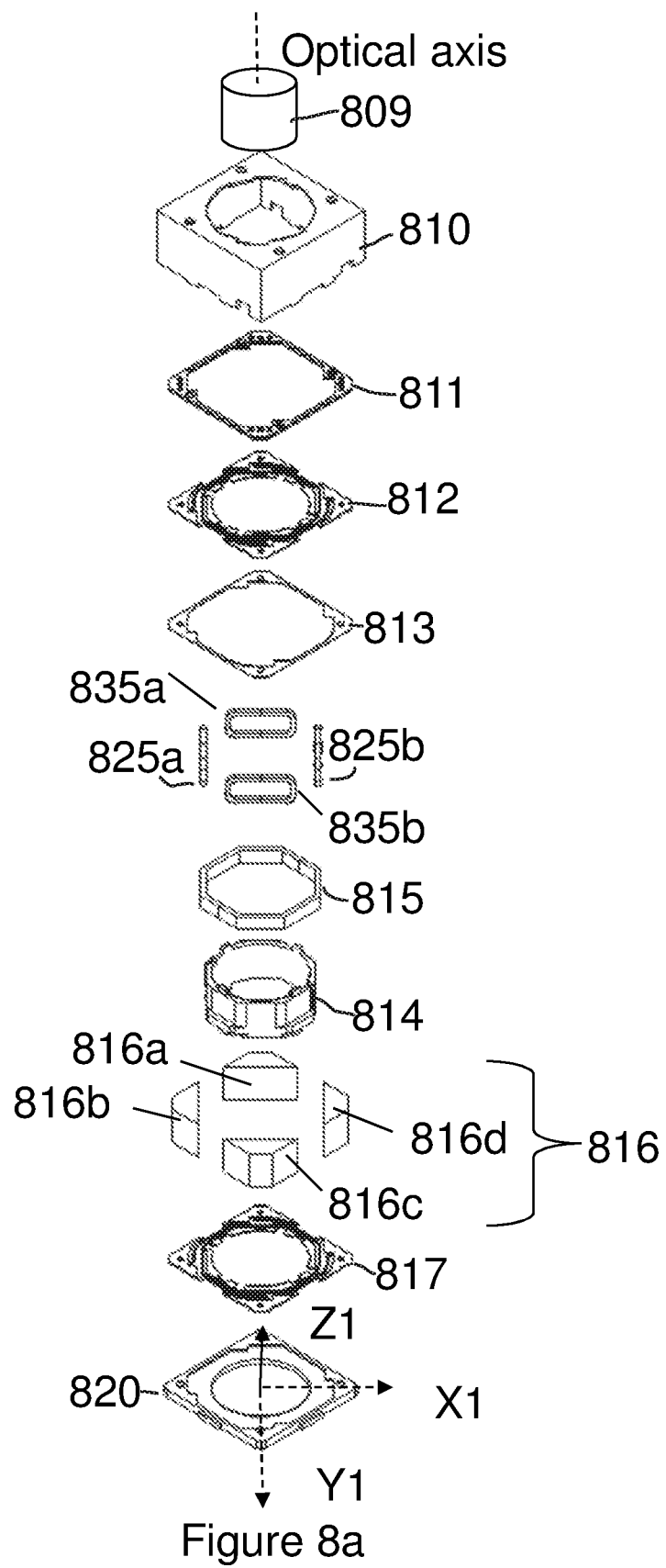
FIG. 8a is an exploded perspective view of a lens driving apparatus with a three axis lens shifting mechanism according to another embodiment of the present patent application.
Figure 8B:
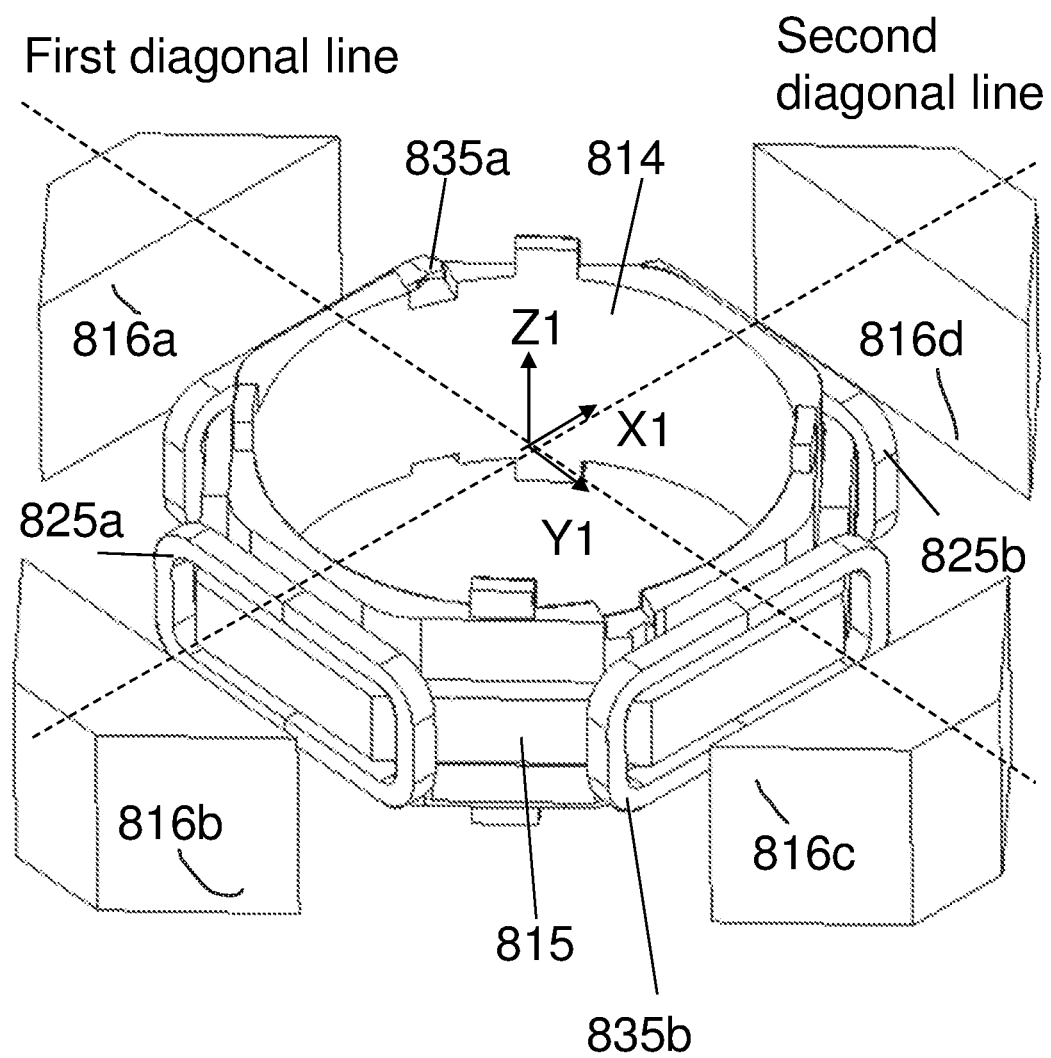

FIGS. 8a and 8b are exploded perspective view and perspective view, respectively, of a lens driving apparatus with a three axis lens shifting mechanism according to another embodiment of the present patent application. The lens driving apparatus can perform auto-focusing and anti-shaking functions.

Referring to FIGS. 8a and 8b, the lens driving apparatus includes a fixed assembly including a base frame 820, a movable assembly including a lens unit 809 and a lens holder 814, springs 812 (top spring) and 817 (bottom spring) connecting the movable assembly and the fixed assembly, a set of magnets 816 including four magnetic members 816a, 816b, 816c and 816d, three sets of coils, a spacer 811 and an outer casing 810. The three sets of coils include one focusing coil 815 and two sets of side coils 825a,b and 835a,b.

The fixed assembly includes a base frame 820. The base frame has a rectangular configuration. The bottom spring 817 is attached to the top of the base frame 820. The four magnetic members 816a, 816b, 816c and 816d of the magnet set are attached to the inside walls of the outer casing 810. The four magnetic members are of triangular cylindrical or trapezoid cylindrical shape and located at the four corners of the outer casing. The outer casing is placed on top of the base frame 820. The first magnetic member 816a and the third magnetic member 816c are placed at the two opposite corner positions along one diagonal line of the lens driving apparatus. The second magnetic member 816b and the fourth magnetic member 816d are placed at the two opposite corner positions along another diagonal line of the lens driving apparatus. The outer casing 810, four magnetic members 816a, 816, 816 and 816d and the base frame 820 forming a central empty space that is configured for receiving the movable assembly. The base frame 820 is placed on an image sensor (not shown in FIGS. 8a and 8b) such as a CCD or CMOS imaging sensor. A through hole defined in a central portion of the base frame 820 receives light focused from the lens unit 809. An image is focused by the lens unit 809 and received by the image sensor.

The bottom and top springs connect the fixed assembly and movable assembly and form a suspension system to support the movable assembly to move along three axes. The first axis Z1 is parallel to the optical axis of lens unit 809. The second axis X1 and the third axis Y1 are perpendicular to the Z1 axis. The alignment line (shown as the first diagonal line in FIG. 8B) of the first magnetic member 816a and the third magnetic member 816c is defined as Y1 axis and the alignment line (shown as the second diagonal line in FIG. 8B) of the second magnetic member 816b and fourth magnetic member 816d is defined as X1-axis. As shown in FIG. 8B, the X1 and Y1 axis may be the two diagonal lines of the lens driving apparatus.

The lens holder 814 may have a polygonal-tube shape. The focusing coil 815 is wound around the outer peripheral sidewall of the lens holder 814, and may have a polygonal-tube shape. The focusing coil 815 is wound around Z1-axis and the plane of focusing coil 815 is perpendicular to Z1-axis. The first set of side coils 835a and 835b are attached to two opposite outer peripheral sidewalls of the lens holder 814. The first set of side coils 835a and 835b are wound around Y1-axis and the plane of side coils 835a and 835b are perpendicular to Y1-axis. The second set of side coils 825a and 825b are attached to another two outer peripheral sidewalls of the lens holder 814. The second set of side coils 825a and 825b are wound around X1-axis and the plane of side coils 825a and 825b are perpendicular to the X1-axis. The four peripheral sidewalls of the focusing coil 815 may be at the same plane with the four coil planes of four side coils respectively.

The three sets of coils interacting with the magnet set surrounding the coil sets produce a driving force to move the moving part along three orthogonal directions. The movable assembly can be driven in the first direction along the optical axis (Z1-axis) by controlling the direction of energizing the focusing coil and a movable parts can be driven in the second direction (X1-axis) or third direction (Y1-axis), which are orthogonal to the optical axis (Z1-axis), by controlling the direction of energizing the first set of side coil and the second set of side coil, respectively. The movable assembly can be independently driven to move along Z1-axis, Y1-axis and X1-axis by independently energizing the focusing coil 815, the first side coil set 835a and 835b and the second side coil set 825a and 825b respectively.

Figure 9A:
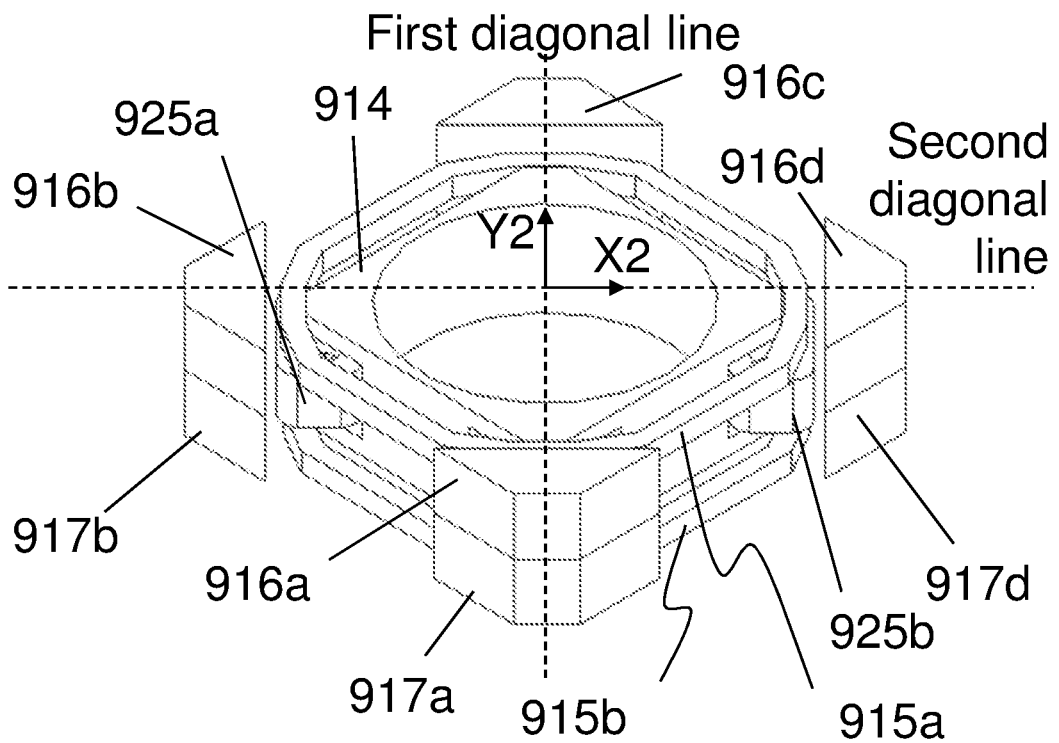
FIG. 9a is a perspective view of a lens driving apparatus with a three axis lens shifting mechanism according to another embodiment of the present patent application.
Figure 9B:
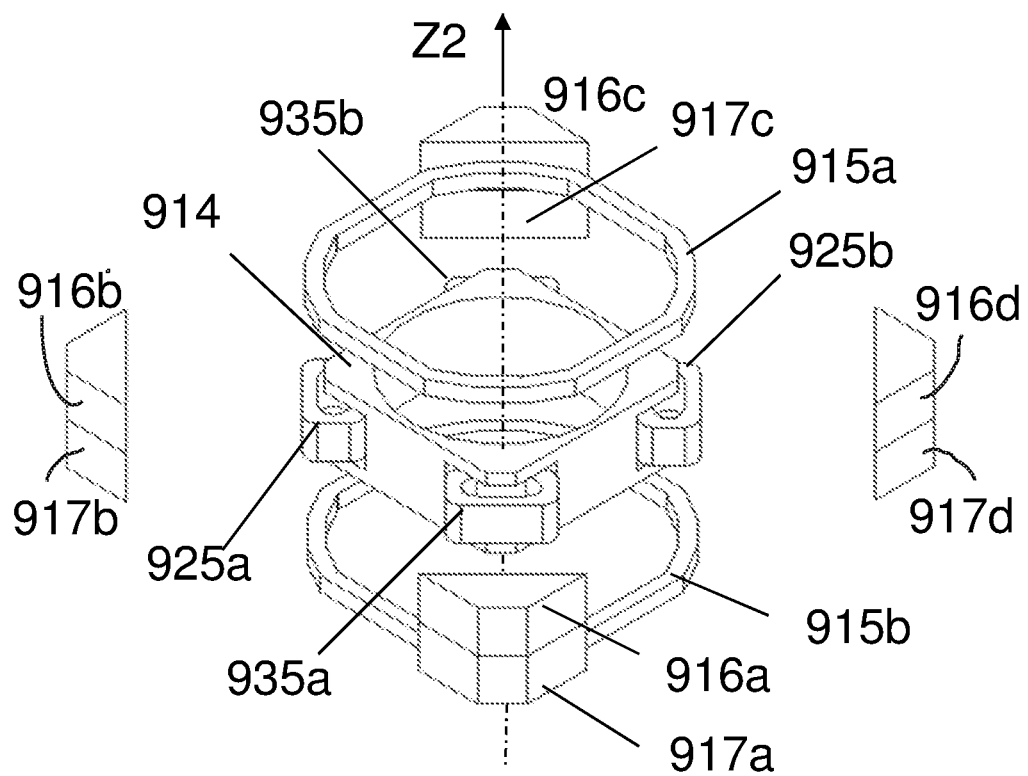

FIGS. 9a and 9b are perspective view and exploded perspective view, respectively, of a lens driving apparatus with a three axis lens shifting mechanism according to yet another embodiment of the present patent application. The lens driving apparatus can perform auto-focusing and anti-shaking functions.

Referring to FIGS. 9a and 9b, the lens driving apparatus includes a fixed assembly including a base frame (not shown in FIGS. 9a and 9b), a movable assembly including lens unit (not shown in FIGS. 9a and 9b) and lens holder 914, springs (not shown in FIGS. 9a and 9b) connecting the movable assembly and the fixing assembly, two sets of magnets (916a-d and 917a-d), three sets of coils, a spacer (not shown in FIGS. 9a and 9b) and an outer casing (not shown in FIGS. 9a and 9b). The two sets of magnets include a top magnet set 916a, 916b, 916c and 916d, and a bottom magnet set 917a, 917b, 917c and 917d. The three sets of coils include one set of focusing coils 915a and 915b and two sets of side coils 925a,b and 935a,b.

Figure 9C:
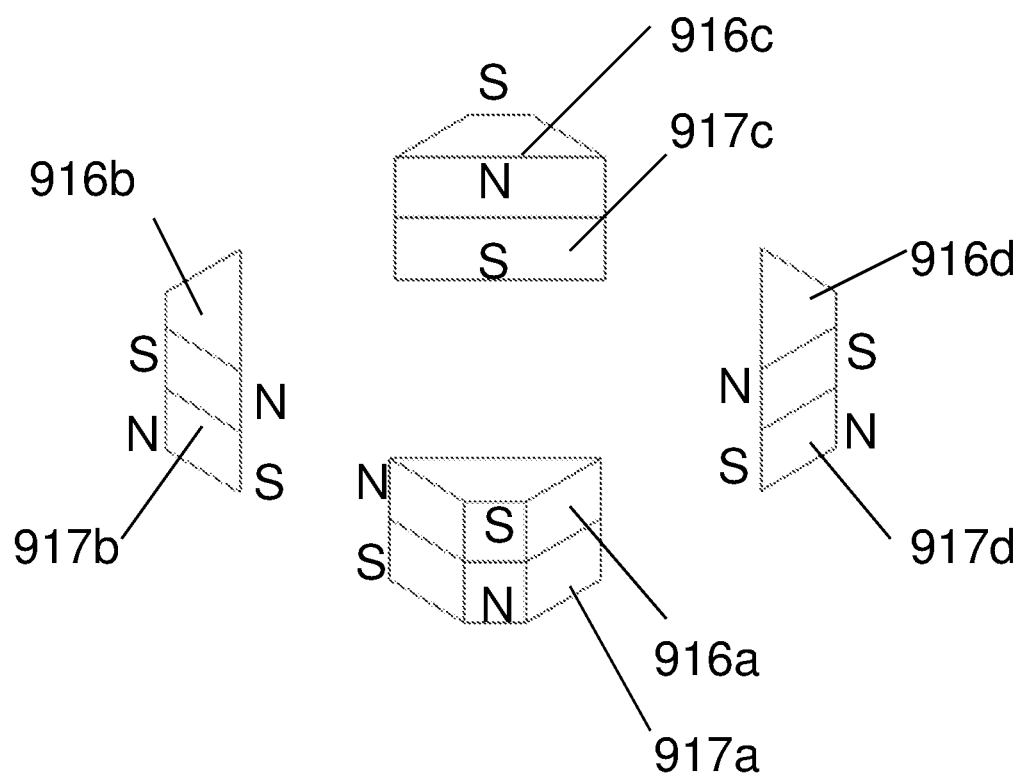

The fixed assembly includes a base frame. The base frame has a rectangular configuration. The bottom spring is attached to the top of the base frame. The two magnet sets 916a-d and 917a-d are attached to the inside walls of the outer casing. The top magnet set is placed on top of the bottom magnet set. The polarity of the top magnet set is opposite to the polarity of the bottom magnet set connected with the top magnet set. For example, the polar surface of the top magnet set 916a-d facing the lens holder 914 is north N, but the polar surface of the bottom magnet 917a-d set facing the lens holder 914 is south S, as shown in FIGS. 9b-9c. The first magnetic members 916a and 917a of the top and bottom magnet sets and the third magnetic members 916c and 917c of the top and bottom magnet sets are placed at two opposite corner positions along a diagonal line of the lens driving apparatus. The second magnetic members 916b and 917b and the fourth magnetic members 916d and 916d are placed at two opposite corner positions along another diagonal line of the lens driving apparatus. The outer casing, two sets of magnets and the base frame form a central empty space that is configured for receiving the movable assembly. The base frame is placed on an image sensor (not shown in FIGS. 9a an 9b) such as a CCD or CMOS imaging sensor. A through hole defined in a central portion of the base frame receives light focused from the lens unit. An image is focused by the lens unit and received by the image sensor.

The bottom and top springs connect the fixing assembly and movable assembly and form a suspension system to support the movable assembly to move along three axes. The first axis Z2 is parallel to the optical axis of lens unit. The second axis (X2-axis) and third axis (Y2-axis) are perpendicular to the Z2-axis. The first diagonal line of the lens driving apparatus is defined as Y2 axis and the second diagonal line of the lens driving apparatus is defined as X2 axis.

The lens holder 914 may have a polygonal-tube shape. The focusing coils 915a and 915b are wound around the outer peripheral sidewall of the lens holder. The focusing coil is wound around Z2-axis and the plane of the focusing coil is perpendicular to Z2-axis. The first set of side coils 935a and 935b are installed at the two opposite outer peripheral sidewalls of the lens holder. The first set of side coils 935a and 935b are wound around Z2-axis and the plane of side coils 935a and 935b are perpendicular to Z2-axis. The second set of side coils 925a and 925b are installed at another two outer peripheral sidewalls of the lens holder. The second set of side coils 925a and 925b are wound around Z2-axis and the plane of side coils 925a and 925b are perpendicular to Z2-axis. The two sets of side coils may be placed at a same plane and between the two focusing coils 915a and 915b.

When currents pass through the focusing coils 915a and 915b, the focusing coil 915a would interact with the top magnets set and the focusing coil 915b would interact with the bottom magnets set so as to induce a driving force along the Z2 axis. When the currents pass through the two set of side coil 925a,b and 935a,b, the two sets of side coil interacting with the magnet field between top magnet set and bottom magnet set induce driving forces to move the lens holder along the X2 axis and the Y2 axis. The movable assembly can be driven in the first direction along the optical axis (Z2-axis) by controlling the direction of currents energizing the focusing coils. The movable assembly can be driven in a second direction (X2-axis) or a third direction (Y2-axis), which are orthogonal to the optical axis (Z2-axis), by controlling the direction of currents energizing the first set of side coils and the second set of side coils respectively. The movable assembly can be independently driven to move along Z2-axis, Y2-axis and X2-axis by independently energizing the focusing coils 915a and 915b, the first side coil set 935a and 935b and second side coil set 925a and 925b respectively.

While the present patent application has been shown and described with particular references to a number of embodiments thereof, it should be noted that various other changes or modifications may be made without departing from the scope of the present invention.

What is claimed is:

1. A lens driving apparatus comprising:
   an outer casing;
   a fixed assembly, the fixed assembly comprising a base frame;
   a movable assembly, the movable assembly comprising a lens holder configured to hold a lens unit;
   a set of magnets surrounding the movable assembly;
   three sets of coils configured to interact with the magnets and drive the movable assembly to move along a first, a second, and a third orthogonal axes;
   a spring system attached between the movable assembly and the fixed assembly;
   wherein:
   the third axis is parallel to an optical axis of the lens unit, while the first and second axes are respectively perpendicular to the third axis;
   the three sets of coils comprise a focusing coil and two sets of side coils;
   the spring system comprises a top spring and a bottom spring;
   the set of magnets comprises four magnetic members attached to inside walls of the outer casing, among which each two magnetic members are placed opposing to each other;
   each magnetic member faces a coil plane of one of the side coils on which the one of the side coils locates;
   the side coils are attached on sidewalls of the lens holder, wherein the side coils are placed near an edge of polar surfaces of the magnetic members respectively, wherein current of the side coils are cutting tangential magnetic field of the magnetic members respectively, wherein the tangential magnetic field is parallel to polar surfaces of the magnetic members respectively, wherein driving forces along the first and second axes are induced by the two sets of side coils and the tangential magnetic field, and wherein each magnetic member is in rectangular shape having a first long side and each side coil is in rectangular shape having a second long side, wherein a length of the second long side of each side coil is longer than a length of the first long side of each magnetic member; and
   the focusing coil is wound around the lens holder and placed at a mid-position of the lens holder along the third axis, and
   wherein a plane on which each wall of the focusing coil locates and each coil plane of each of the side coils are in same plane, wherein the plane is facing the magnetic members; and
   the lens driving apparatus further comprises a magnetic field correction unit that is inserted between corners of the magnetic members and configured to guide the magnetic field between the magnetic members, wherein the magnetic field correction unit has a plane shape, a ring shape or a tube shape, installed on top or bottom of the magnet set, and constructed by a yoke material or a ferromagnetic material.

2. The lens driving apparatus of claim 1, wherein polar surfaces of the magnetic members facing the coils are of the same magnetic polarity.

3. The lens driving apparatus of claim 1, wherein among the two sets of side coils, a first set of side coils are attached on two opposite outer peripheral sidewalls of the lens holder.

4. The lens driving apparatus of claim 3, wherein the first set of side coils is wound around the second axis and coil planes of the first set of side coils are perpendicular to the second axis.

5. The lens driving apparatus of claim 3, wherein a second set of side coils is attached on another two outer peripheral sidewalls of the lens holder, while the second set of side coils are wound around the first axis and coil planes of the second set of side coils are perpendicular to the first axis.

6. The lens driving apparatus of claim 1, wherein the side coils are overlapped with the focusing coil.

7. The lens driving apparatus of claim 1, wherein the focusing coil is placed approximately at a mid-point between the top spring and the bottom spring.

8. The lens driving apparatus of claim 1, wherein the focusing coil is wound around an outer peripheral sidewall of the lens holder.

9. The lens driving apparatus of claim 1, wherein the two sets of side coils comprise four side coils, while planes on which four outer peripheral sidewalls of the focusing coil locate are in the same plane as four coil planes of the four side coils respectively.

10. The lens driving apparatus of claim 1, wherein the focusing coil is placed approximately at a middle position of the magnetic members, current of the focusing coil is cutting a normal magnetic field of the magnetic members, the normal magnetic field is perpendicular to polar surfaces of the magnetic members, and a driving force along the third axis is induced by the focusing coil and the normal magnetic field.

11. The lens driving apparatus of claim 1, wherein the focusing coil and the side coils are configured to interact with the four magnetic members, but to independently generate driving forces along the first, second, and third orthogonal axes respectively for moving the movable assembly.

12. A lens driving apparatus comprising:
   a fixed assembly, the fixed assembly comprising a base frame;

a movable assembly, the movable assembly comprising a lens holder configured to hold a lens unit;
at least one set of magnets surrounding the movable assembly;
three sets of coils configured to interact with the magnets and drive the movable assembly to move along a first, a second, and a third orthogonal axes;
a spring system attached between the movable assembly and the fixed assembly; wherein:
the third axis is parallel to an optical axis of the lens unit, while the first and second axes are respectively perpendicular to the third axis;
the three sets of coils comprise a set of focusing coils and two sets of side coils; the at least one set of magnets comprises four magnetic members attached to inside walls of an outer casing, among which each two magnetic members are placed opposing to each other; and, wherein each magnetic member faces a coil plane of one of the side coils on which the one of the side coils locates, wherein the side coils are attached on sidewalls of the lens holder, wherein the side coils are placed near an edge of polar surfaces of the magnetic members respectively, wherein current of the side coils are cutting tangential magnetic field of the magnetic members respectively, wherein the tangential magnetic field is parallel to polar surfaces of the magnetic members respectively, wherein driving forces along the first and second axes are induced by the two sets of side coils and the tangential magnetic field, wherein each magnetic member is in rectangular shape having a first long side and each side coil is in rectangular shape having a second long side, wherein a length of the second long side of each side coil is longer than a length of the first long side of each magnetic member and
the focusing coil is wound around the lens holder and placed at a mid-position of the lens holder along the third axis, and
wherein a plane on which each wall of the focusing coil locates and each coil plane of each of the side coils are in same plane, wherein the plane is facing the magnetic members; and
the lens driving apparatus further comprises a magnetic field correction unit that is inserted between corners of the magnetic members and configured to guide the magnetic field between the magnetic members, wherein the magnetic field correction unit has a plane shape, a ring shape or a tube shape, installed on top or bottom of the magnet set, and constructed by a yoke material or a ferromagnetic material.

13. The lens driving apparatus of claim 12, wherein among the two sets of side coils, a first set of side coils are wound around the third axis and plane of the first set of side coils are perpendicular to the third axis, while a second set of side coils are wound around the third axis and plane of the second set of side coils are perpendicular to the third axis.

14. The lens driving apparatus of claim 12, wherein the set of focusing coils comprise two focusing coils, while the two sets of side coils are placed at a same plane and between the two focusing coils.

15. A lens driving apparatus comprising:
a fixed assembly, the fixed assembly comprising a base frame;
a movable assembly, the movable assembly comprising a lens holder configured to hold a lens unit;
a set of magnets surrounding the movable assembly; three sets of coils configured to interact with the magnets and drive the movable assembly to move along a first, a second, and a third orthogonal axes;
a spring system attached between the movable assembly and the fixed assembly; wherein:
the third axis is parallel to an optical axis of the lens unit, while the first and second axes are respectively perpendicular to the third axis;
the three sets of coils comprise a focusing coil and two sets of side coils;
each set of magnets comprises four magnetic members attached to inside walls of an outer casing, among which each two magnetic members are placed opposing to each other;
the focusing coil is wound around an outer peripheral sidewall of the lens holder and placed at a mid-position of the lens holder along the third axis; and among the two sets of side coils, a first set of side coils are attached on two opposite outer peripheral sidewalls of the lens holder, while a second set of side coils are attached on another two outer peripheral sidewalls of the lens holder, wherein each magnetic member faces a coil plane of one of the side coils on which the one of the side coils locates, and side coils are placed near an edge of polar surfaces of the magnetic members respectively, wherein current of the side coils are cutting tangential magnetic field of the magnetic members respectively, wherein the tangential magnetic field is parallel to polar surfaces of the magnetic members respectively, wherein driving forces along the first and second axes are induced by the two sets of side coils and the tangential magnetic field, and wherein each magnetic member is in rectangular shape having a first long side and each side coil is in rectangular shape having a second long side, wherein a length of the second long side of each side coil is longer than a length of the first long side of each magnetic member, and
wherein a plane on which each wall of the focusing coil locates and each coil plane of each of the side coils are in same plane, wherein the plane is facing the magnetic members; and
the lens driving apparatus further comprises a magnetic field correction unit that is inserted between corners of the magnetic members and configured to guide the magnetic field between the magnetic members, wherein the magnetic field correction unit has a plane shape, a ring shape or a tube shape, installed on top or bottom of the magnet set, and constructed by a yoke material or a ferromagnetic material.

16. The lens driving apparatus of claim 15, wherein the first set of side coils is wound around the second axis and coil planes of the first set of side coils are perpendicular to the second axis, while the second set of side coils is wound around the first axis and coil planes of the second set of side coils are perpendicular to the first axis.

17. The lens driving apparatus of claim 15, wherein the focusing coil and the two sets of side coils are configured to interact with the magnetic members, but to independently generate driving forces along the first, second, and third orthogonal axes respectively for moving the movable assembly.

* * * * *